United States Patent
Schroeder et al.

(10) Patent No.: US 7,517,425 B2
(45) Date of Patent: Apr. 14, 2009

(54) METHOD FOR ADHESIVE BONDING OF A TUBULAR MEMBER TO A CASTING

(75) Inventors: Jessica A. Schroeder, Sterling Heights, MI (US); Anil K. Sachdev, Rochester Hills, MI (US); Mark W. Verbrugge, Troy, MI (US); James G. Schroth, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/749,763

(22) Filed: May 17, 2007

(65) Prior Publication Data
US 2007/0270029 A1    Nov. 22, 2007

Related U.S. Application Data

(60) Provisional application No. 60/801,257, filed on May 18, 2006.

(51) Int. Cl.
*B29C 65/00* (2006.01)
*B32B 37/00* (2006.01)
*B60J 7/00* (2006.01)
*F16B 9/00* (2006.01)
*F16B 11/00* (2006.01)
*F16B 12/04* (2006.01)
*F16L 13/00* (2006.01)
*B25G 3/34* (2006.01)
*G05G 1/12* (2006.01)

(52) U.S. Cl. .............. 156/293; 156/294; 296/203.01; 403/361; 403/263; 403/268

(58) Field of Classification Search ............... 156/293, 156/294, 295; 296/203.01; 403/263, 268, 403/361; 411/82.3; 405/259.1, 259.5, 259.6
See application file for complete search history.

(56) References Cited

U.S. PATENT DOCUMENTS

| | | | |
|---|---|---|---|
| 4,585,247 A | 4/1986 | Takada | ............ 280/281 R |
| 4,618,163 A | 10/1986 | Hasler et al. | |
| 4,652,193 A * | 3/1987 | Hibbs | .............. 411/82.3 |
| 5,427,198 A * | 6/1995 | Walsh | .............. 182/46 |
| 5,458,393 A | 10/1995 | Benedyk | .............. 296/203 |
| 5,466,086 A * | 11/1995 | Goto | .............. 403/268 |
| 5,569,007 A * | 10/1996 | Abraham | .............. 411/82 |
| 5,916,781 A | 6/1999 | Derees | |

(Continued)

FOREIGN PATENT DOCUMENTS

JP          59196379 A * 11/1984

OTHER PUBLICATIONS

International Search Report for PCT/US07/69088 mailed Jan. 8, 2008 and corresponding to the subject application.

*Primary Examiner*—Jeff Aftergut
*Assistant Examiner*—Brian R Slawski

(57) ABSTRACT

A method is provided for attaching a hollow tubular member to a cast member. The cast member has a hollow socket cavity. A body of uncured adhesive is positioned in either the hollow socket of the cast member or the hollow interior of the hollow tubular member. The hollow tubular member is inserted in the hollow cavity. The adhesive is forced to flow into the space between the outside of the tubular member and the socket of the cast member, and the adhesive is then cured.

7 Claims, 4 Drawing Sheets

U.S. PATENT DOCUMENTS

| | | | |
|---|---|---|---|
| 6,010,182 A | 1/2000 | Townsend | 296/203.01 |
| 6,468,010 B2 * | 10/2002 | Sager et al. | 411/82 |
| 6,533,362 B1 | 3/2003 | Simmons | |
| 7,338,234 B2 * | 3/2008 | Rataj et al. | 405/259.6 |
| 2004/0086358 A1 * | 5/2004 | Powers et al. | 411/451.2 |

* cited by examiner

METHOD FOR ADHESIVE BONDING OF A TUBULAR MEMBER TO A CASTING

CROSS REFERENCE TO RELATED APPLICATIONS

This application claims the benefit of U. S. provisional Application No. 60/801,257 filed May 18, 2006, which is hereby incorporated herein by reference.

FIELD OF THE INVENTION

The present invention relates to adhesively bonding a tubular structure, such as a roll formed or extruded tube, to a cast member such as a die casting.

BACKGROUND OF THE INVENTION

It is well known that automobile bodies and chassis can be constructed of tubular members that are connected together at cast nodes that have sockets for receiving the ends of the tubular members. The prior art has proposed various arrangements for attaching the tubular members within the sockets, such as welding, mechanical fasteners, adhesives, etc.

In the case of adhesive attachments, it is known to apply the adhesive to the outside of the tubular member and then insert the tubular member into the socket. It is also known to apply the adhesive to the inside side wall of the socket and then insert the tubular member into the socket. In either case, application of the adhesive must be carefully controlled and the insertion of the tubular member must be carefully centered in the socket in order to achieve uniform and consistent thickness and length of the adhesive bond.

It would be desirable to have an improved method for adhesive bonding a tubular member in the socket of a cast joint, including greater ease in applying the adhesive, improved centering of the tubular member, and assured uniform and consistent thickness and length of the adhesive bond.

SUMMARY OF THE INVENTION

A method is provided for attaching a hollow tubular member to a cast member. The cast member has a hollow socket cavity. A body of uncured adhesive is positioned in either the hollow socket of the cast member or the hollow interior of the hollow tubular member. The hollow tubular member is inserted in the hollow cavity. The adhesive is forced to flow into the space between the outside of the tubular member and the socket of the cast member. Then the adhesive is then cured.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain embodiments is merely exemplary in nature and is not intended to limit the invention, its application, or uses.

Figure 1:
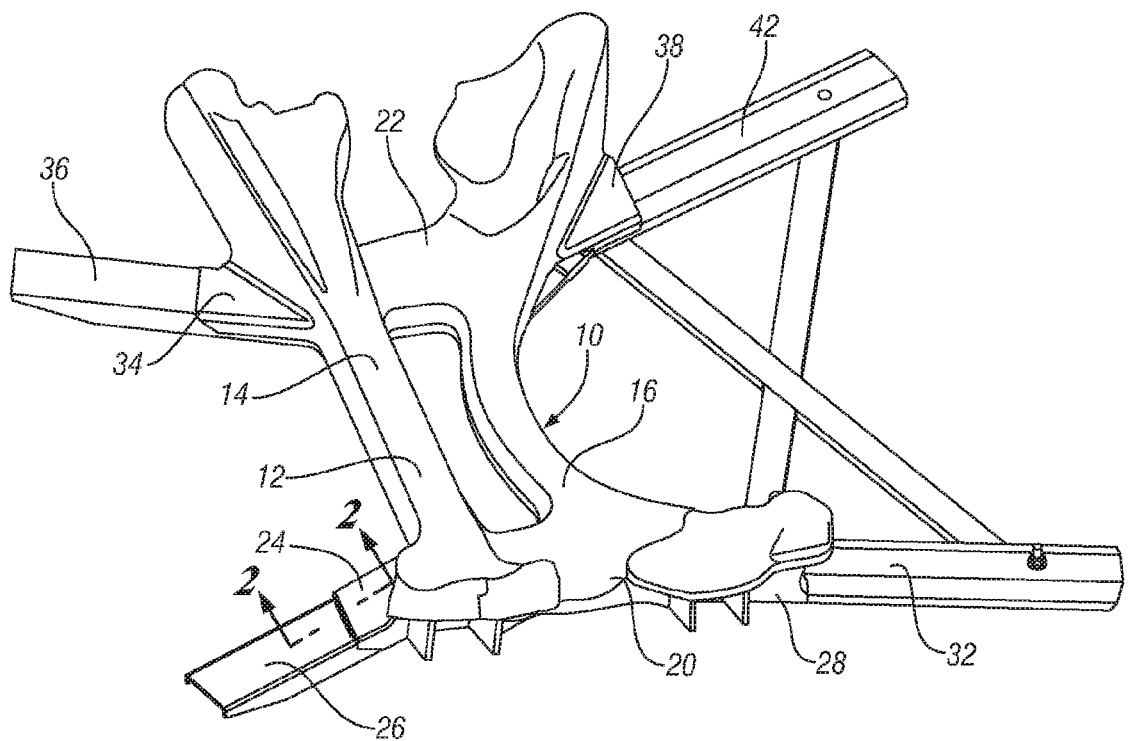
FIG. 1 is a perspective view of an engine cradle for a motor vehicle that is assembled from a casting and a plurality of tubular members that are adhesively attached to the casting.

Referring to FIG. 1, an engine support cradle 10 for a motor vehicle includes a large casting 12, including two cross members 14 and 16 that are connected by side members 20 and 22. Side member 20 has a socket portion 24 at the forward end that receives a front tubular member 26, and a socket portion 28 at the rearward end that receives a rear tubular member 32. Likewise, the side member 22 has a socket portion 34 at the forward end that receives a front tubular member 36, and a socket portion 38 at the rearward end that receives a rear tubular member 42.

Figure 2:
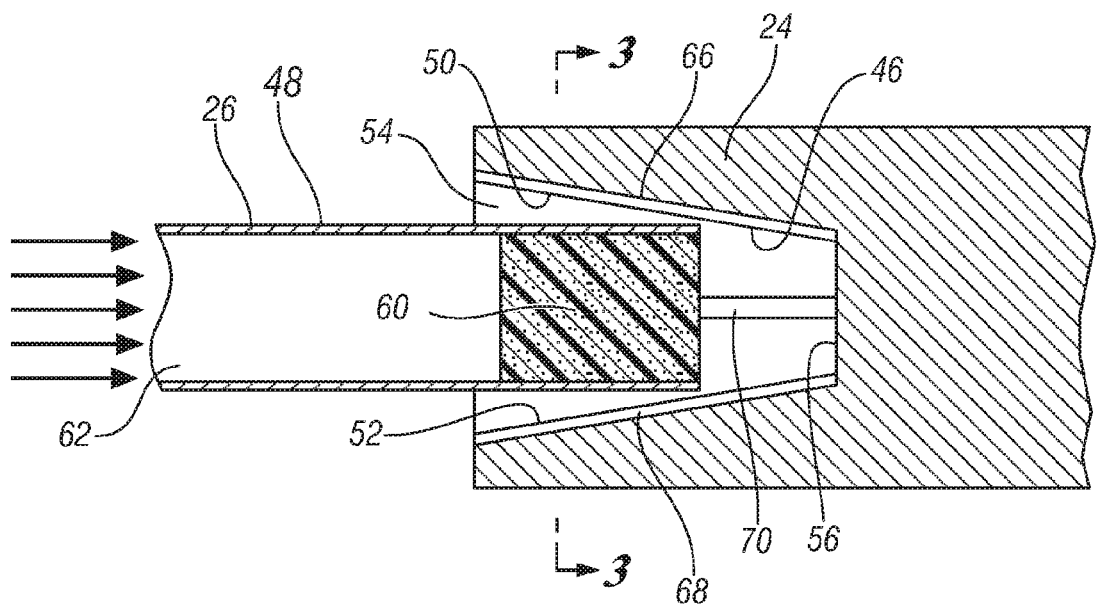
FIG. 2 is a longitudinal section view taken in the direction of arrows 2-2 of FIG. 1.
Figure 3:
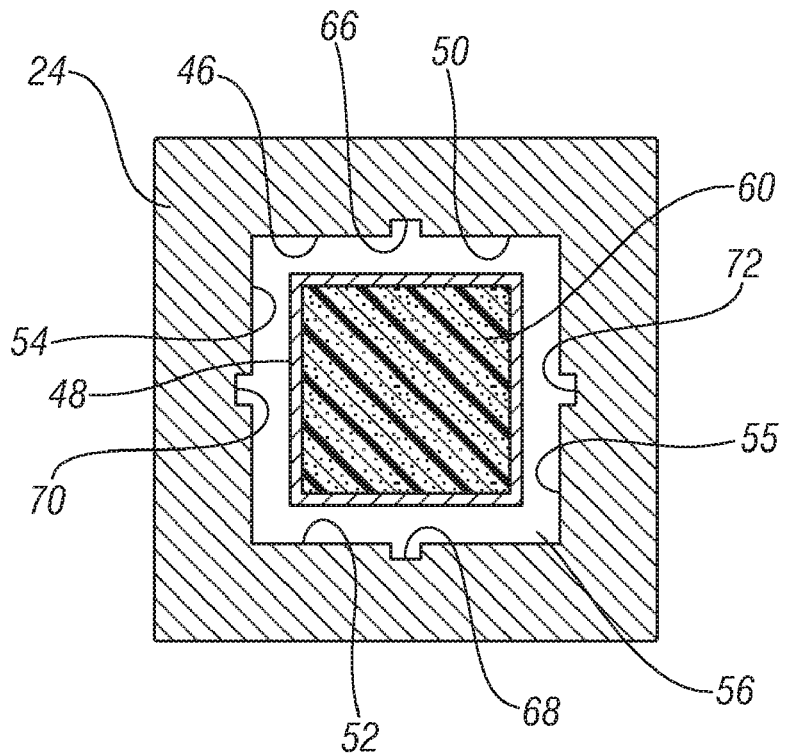
FIG. 3 is a cross section taken in the direction of arrows 3-3 of FIG. 2.

Referring to FIGS. 2 and 3, it is seen that socket portion 24 has a socket 46 that is rectangular in cross section as shown in FIG. 3. The socket 46 is defined by socket side walls, including a top wall 50, bottom wall 52, left wall 54, and right wall 55. These socket side walls are tapered and converge toward one another and end at an end wall 56. Tubular member 26 is a rectangular hollow tube and is sized to fit into the socket 46 and leave a space between an outer or outside wall 48 of the tubular member 26 and the socket side walls for the placement of an adhesive. The taper of the socket side walls 50, 52, 54 and 55 will aid in the insertion of the tubular member 26 by funneling the tubular member 26 toward the center of the socket 46.

Figure 4:
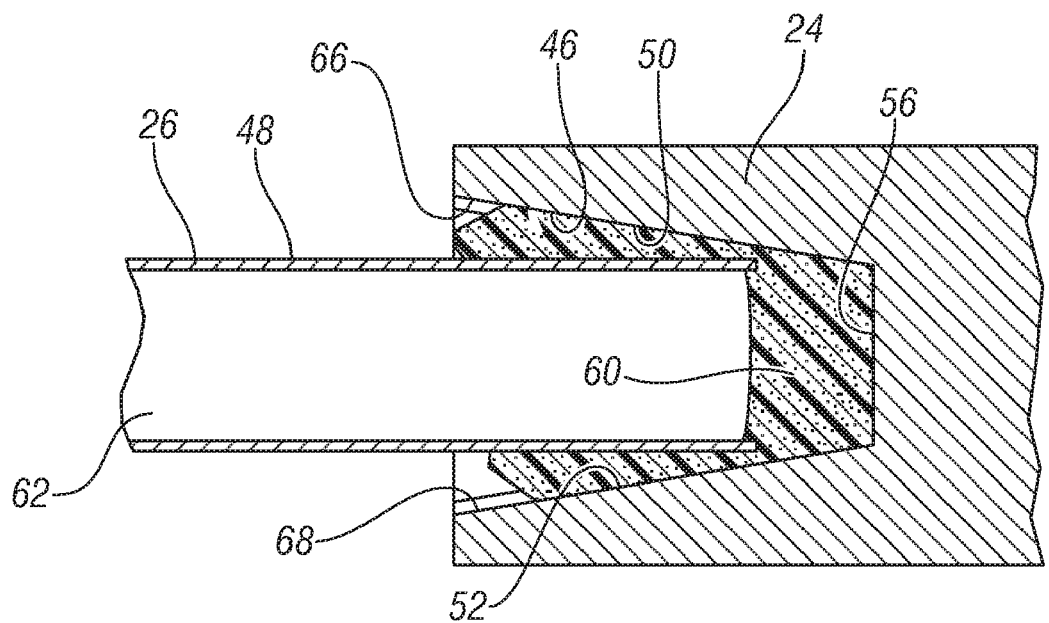
FIG. 4 is a view similar to FIG. 2 but showing the completed adhesive bonding of the tubular member to the casting.

As seen in FIG. 2, adhesive 60 is placed in the end of the tubular member 26. The adhesive 60 may be pre-positioned into the tubular member 26 before the tubular member 26 is inserted into the socket 46. Or the adhesive 60 may be positioned into the tubular member 26 through the open end 62 after the tubular member 26 has been inserted. In either case, pressurized gas is then introduced into the open end 62 causing the adhesive 60 to be displaced from the tubular member 26 and, as seen in FIG. 4, the adhesive flows rightwardly out of the inside of the tubular member 26, to the end wall 56, and then leftwardly around the outer wall surface 48 of the tubular member 26 into the space between the socket side walls of the socket 46 and the outer wall surface 48 of the tubular member 26. The adhesive 60 will then be cured to effect a permanent adhesive bonded attachment. In FIG. 4, the insertion of the tubular member 26 has stopped short of the tubular member 26 becoming engaged with the tapered socket wall 50, 52, 54 and 55 so that the flow of adhesive is not blocked.

Referring to FIG. 3, it is seen that adhesive flow channels including a top channel 66 on the top wall 50, a bottom channel 68 in the bottom wall 52, a side channel 70 in the left wall 54, and a side channel 72 in the right wall 55 may be provided to assure flow of the adhesive 60 if the end of the tubular member 26 were to be more fully inserted into the socket 46 and engage with the socket side walls 50, 52, 54 and 55 during assembly Thus the tubular member 26 may be inserted by allowing the tubular member 26 to engage with one of the socket walls so that the tubular member 26 is centered by the convergence of the taper of the socket side walls, until the end of the tubular member 26 engages with all four of the socket side walls 50, 52, 54 and 55.

FIG. 4 shows the adhesive 60 as having been fully expelled from the interior of the tubular member 26. However, in some applications it may be desirable to leave a portion of the adhesive 60 within the inside of the tubular member. Thus, upon curing of the adhesive, there will be an adhesive bond with both the inside of the tubular member and also the outer wall surface 48 of the tubular member 26.

Although FIGS. 2, 3 and 4 show the example of the socket 46 and the structural member 26 having a square cross section, it will be understood that the socket 46 and the structural member 26 can have a round cross section. In the case of round cross section, the presence of the channels in the side wall provides a mechanical interference between the adhesive and the socket side wall that will strengthen the bonded attachment against rotation of the tubular member 26 within the socket 46. It will be understood that the channels can be provided in any number and have any shape, as needed and desired to promote and manage the flow of the adhesive from the inside of the tubular member 26 to the outside of the tubular member 26.

Although FIGS. 2, 3 and 4 show the example of the channels being formed in the socket 46, the channels can be formed on the outside wall surface 48 of the tubular member 26, or formed by notching the ends of the tube as will be discussed hereinafter with reference to FIGS. 5 and 6. And in some applications the channels may not be needed at all if the insertion of the tubular member 26 is stopped before engaging with the tapered walls 50, 52, 54 and 55.

Figure 5:
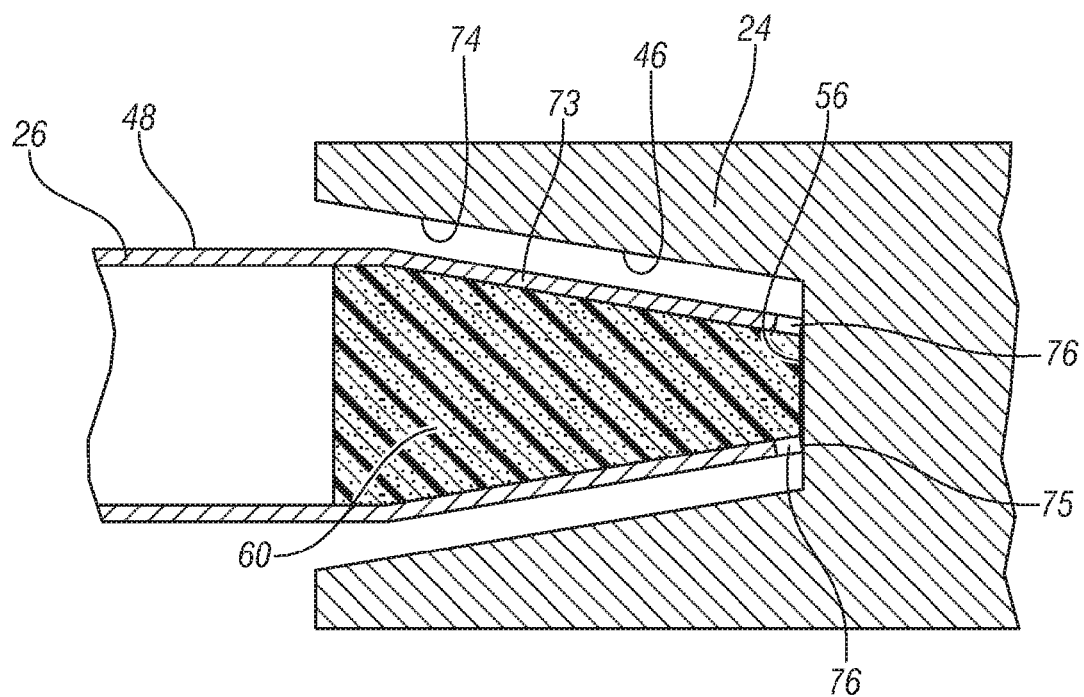
FIG. 5 is a longitudinal section view of a second embodiment of the invention.

FIG. 5 shows another embodiment of the invention in which the tubular member 26 of round cross-section has a tapered wall portion 73 at its forward end that matches the taper of a circular wall 74 of the socket 46. The tubular member 26 has been inserted until an end face 75 of the tubular member has engaged with the end wall 56 of the socket 46. A plurality of channels 76 are notches cut into the end face 75 to provide a path for flow of the adhesive 60.

Figure 6:
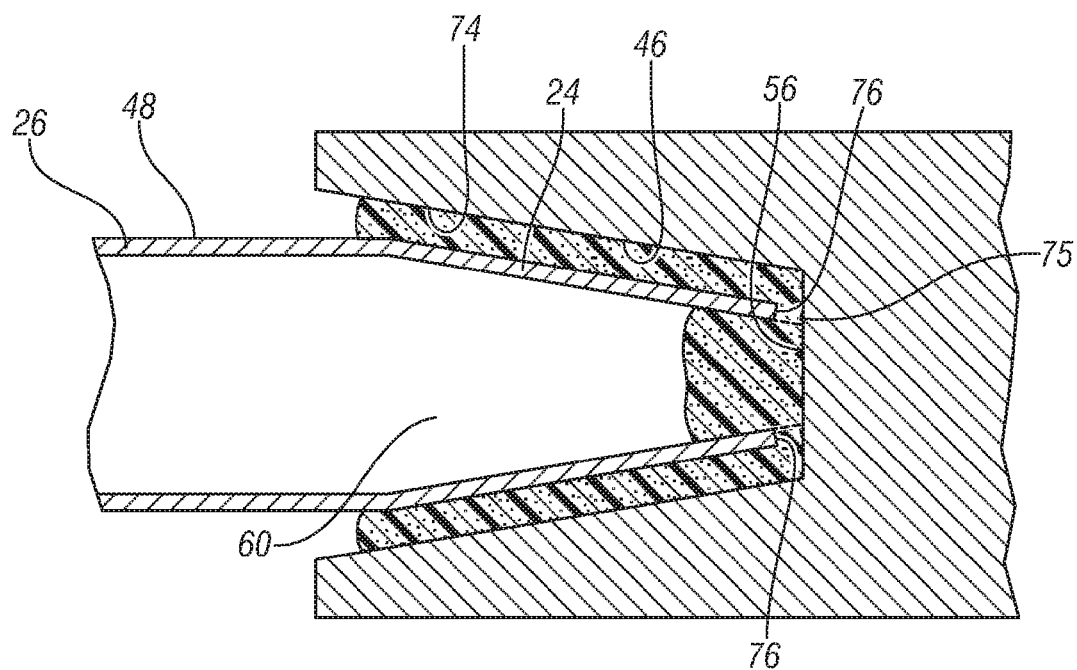
FIG. 6 is a view similar to FIG. 5 but showing the completed adhesive bonding of the tubular member to the casting.

FIG. 6 shows that gas pressure has been introduced into the open end of the tubular member 26 and a part of the adhesive 60 has been expelled through the channels 76 into the space between the outside surface 48 of the tubular member 26 and the circular wall 74 of the socket 46. As seen in FIG. 6, the matching tapers on the tubular member and the socket result in the adhesive bond acting therebetween having a uniform thickness along the length of the adhesive bond. FIG. 6 also shows that a portion of the adhesive 60 is remaining inside the tubular member 26 and the adhesive is also acting between the end wall 56 of the socket and the end face 75, as well as being lodged in the channels 76, all contributing to the strength of the adhesive bond between the tubular member 26 and the socket 46. It will also be understood that, as alternative to making notches in the end face 75, the channels 76 can be provided by making holes that extend radially through the wall of the tubular member 26, or by providing channels by forming grooves in the end wall 56 of the socket.

Figure 7:
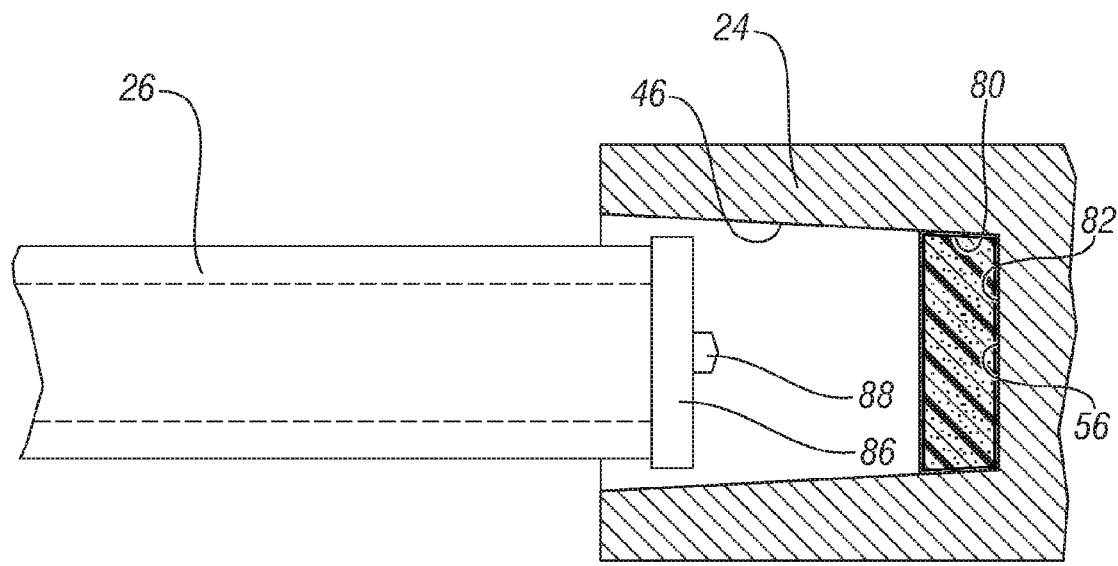
FIG. 7 is a longitudinal section view of another embodiment of the invention; and, FIG. 8 is a view similar to FIG. 7 but showing the completed adhesive bonding of the tubular member to the casting.
Figure 8:
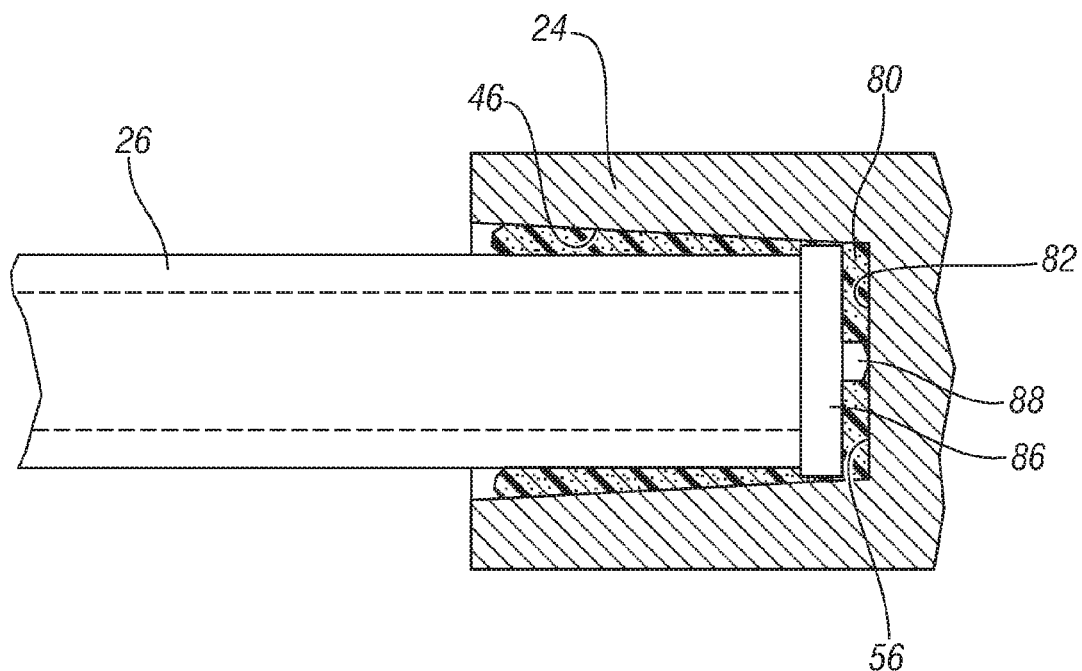

FIG. 7 shows another embodiment of the invention. A body of adhesive 80 is bagged in a pouch 82 and the pouch 82 is deposited in the socket 46. The tubular member 26 has a closed end provided by an end cap 86 that has a projection 88 projecting therefrom toward the pouch 82. As the tubular member 26 is inserted into the socket 46 from its position of FIG. 7 to its final position of FIG. 8, the projection 88 will pierce the pouch 82 to release the adhesive 80, and the end cap 86 will compress the adhesive 80 and force the adhesive 80 to flow around the outside of the tubular member 26 where it cures to provide a permanent adhesive bonding of the tubular member 26 to the casting 12. When the projection 88 pierces the pouch 82, the adhesive is given an assured path to escape the pouch 82, thereby-avoiding any tendency of the pouch 82 to be pushed out in to the space between the outside of the tubular member 26 and the socket 46. The pouch 82 can be of a preformed shape to precisely fit the end of the socket 46 as shown in FIG. 7, or the pouch 82 can be flexible so that pouch 82 will be flaccid, lie on the bottom of the socket 46, then be pushed into place at the end wall 56 of the socket 46 by the advance of the end cap 86, and then be burst open or pierced. If desired, the adhesive 80 can be deposited without using a pouch, in which case the projection 88 can be omitted from the end cap 86. Or if desired, the projection 88 can be sized to engage with the end wall 56 of the socket 46, as seen in FIG. 8, to create a stand-off and control the degree of insertion of the tubular member 26 into the socket 46. Thus the projection 88 can serve either or both functions of piercing the pouch 82 and limiting the insertion of the tubular member 26, or the projection 88 can be omitted. If needed, flow channels can be provided in the side walls of the socket 46.

The tubular member 26 may be of round, rectangular or other cross-section, or may be an open sided channel if desired, it being understood that the socket of the socket portion 24 will be designed to have a complementary shape for closely receiving the tubular member. Although the drawings show the socket walls as being considerably tapered toward the end wall of the cavity, the taper of the socket walls may be the draft angle that is typically employed in the casting and die casting process. The tubular member 26 can be of any metal, such as magnesium, aluminum or steel. Likewise the large casting 12 and its cast socket portions can be of any metal.

If the tubular member and the large casting are made of dissimilar metals, then the layer of cured adhesive that cures between the dissimilar metals will isolate the dissimilar metals and prevent galvanic corrosion. The adhesive can be a heat curable adhesive if desired, and the adhesive may be warmed or pre-heated prior to being dispensed into the socket to improve the flow of the adhesive and improve the wetting action between the adhesive and the metal surfaces. Typical adhesives that may be chosen for use are the "toughened adhesives", such as No. 1484 or 1482 by the Dow Chemical Company, or No. 5087 by Henkel, or other toughened adhesive such as Dow 1496V or Henkel 4555B.

Although the drawings show the example of an engine cradle, the attachment method can be employed in instrument panel beam constructions, as well as other automotive and non-automotive applications.

The foregoing description of the invention is merely exemplary in nature and, thus, variations thereof are intended to be within the scope of the invention.

What is claimed is:

1. A method of attaching a hollow tubular member to a cast member comprising:

providing a socket in the cast member, said socket having tapered walls;

providing on said tubular member a tapered wall matching the taper of the tapered walls of the socket so that upon subsequent insertion of the tubular member into the socket the space between the outside of the tubular member and the socket of the cast member has a uniform thickness for receiving an adhesive and the resulting adhesive bond will be of uniform thickness;

positioning a body of adhesive in the hollow interior of the hollow tubular member;

inserting the hollow tubular member into the socket so that the adhesive is inserted with the insertion of the tubular member, and then introducing gas pressure to displace the adhesive out of the tubular member and into the space between the outside of the tubular member and socket of the cast member;

and curing the adhesive.

2. The method of claim 1 further comprising adhesive flow channels provided in either or both of the socket and the tubular member to assure flow of adhesive even if the tubular member is inserted into engagement with the socket walls.

3. The method of claim 1 further comprising said tapered walls of the socket having adhesive flow channels to assure flow of adhesive even if the tubular member engages with the tapered walls of the socket.

4. The method of claim 1 further comprising only some of the adhesive being displaced and at least some of the adhesive remaining in the hollow interior and upon curing being adhered to the interior of the tubular member.

5. A method of attaching a hollow tubular member to a cast member comprising:

providing a socket in the cast member; said socket of the cast member having side walls and an end wall, said side walls being tapered and converging toward the end wall to be engaged by the tubular member upon insertion into the hollow socket, and adhesive flow channels being provided in the tapered side walls or in the tubular member to provide a path for flow of the adhesive to the outside of the tubular member;

positioning a body of adhesive in the hollow interior of the hollow tubular member;

inserting the hollow tubular member into the socket so that the adhesive is inserted with the insertion of the tubular member, and then introducing gas pressure to displace the adhesive out of the tubular member and into the space between the outside of the tubular member and socket of the cast member;

and curing the adhesive.

6. A method of attaching a hollow tubular member to a cast member comprising:

providing a socket in the cast member having side walls and an end wall, said side walls being tapered and converging toward the end wall and said end wall being engaged by the tubular member upon insertion of the tubular member into the hollow socket, providing adhesive flow channels in the tapered side walls or in the tubular member to provide a path for flow of the adhesive to the outside of the tubular member, providing on said tubular member a tapered wall generally matching the taper of the side walls of the cast member so the adhesive bond will be of uniform thickness;

positioning a body of adhesive in the hollow interior of the hollow tubular member;

inserting the hollow tubular member into the socket so that the adhesive is inserted with the insertion of the tubular member, and then introducing gas pressure to displace the adhesive out of the tubular member and into the space between the outside of the tubular member and socket of the cast member;

and curing the adhesive.

7. The method of claim 6 further comprising only some of the adhesive being displaced and at least some of the adhesive remaining in the hollow interior and upon curing being adhered to the interior of the tubular member.

\* \* \* \* \*